Patented Feb. 21, 1933

1,898,953

UNITED STATES PATENT OFFICE

PAUL GROSSMANN, OF BASEL, SWITZERLAND, ASSIGNOR TO THE FIRM OF SOCIETY OF CHEMICAL INDUSTRY IN BASLE, OF BASEL, SWITZERLAND

PROCESS OF MAKING USEFUL CONDENSATION PRODUCTS OF THE ANTHRACENE SERIES AND NEW ANTHRAQUINONE DERIVATIVES

No Drawing. Application filed January 30, 1931, Serial No. 512,503, and in Switzerland February 1, 1930.

The present invention relates to the manufacture of condensation products of the anthracene series which, by oxidation, are converted into anthraquinone derivatives which are valuable acetate silk dyestuffs and of which a number are new. It comprises the process of making these new products, the new products themselves, and the material that has been dyed with the new products.

In the specification of application Serial No. 415,601 it is shown that the leuco-derivatives of $\alpha$-hydroxy-anthraquinones have a tendency to exchange the OH-group for the NH-aryl-group when they are heated in aqueous solution or suspension with boric acid and a primary aromatic amine.

The present invention is based on the observation that amines of the general formula $NH_2\text{-}R_1$, wherein $R_1$ stands for hydrogen, alkyl, or aralkyl, in the presence of boric acid also have a tendency to react with leuco-derivatives of the hydroxyanthraquinones of the general formula

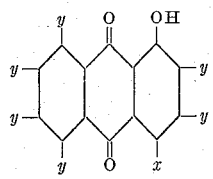

wherein $x$ stands for OH or NHR (R=H or alkyl), and $y$ stands for H or a substituent of a group of substituents, consisting of $SO_3H$, halogen, OH, O-alkyl, NH-R (R=H or alkyl) the result of the reaction being an exchange of the OH-group for $NH_2$-group or NH-alkyl-group or NH-aralkyl-group. If the reaction has occurred in concentrated solutions of the organic amines, an aminogroup standing in para-position to the converted OH-group may be converted into an alkyl- or aralkyl-amino-group.

It is known that ammonia or an aliphatic primary amine will yield the product of reaction with $\alpha$-hydroxyanthraquinones or their leuco-derivatives, even at the temperature of the water-bath. It could not be foreseen from this fact, however, that by the addition of boric acid a deep-seated reaction would be produced, namely one which is to be recognized by the shifting of the colour of the dyeings produced by means of the products converted into anthraquinone derivatives by oxidation towards the green side of the spectrum.

The reaction in accordance with the invention may be conducted in such a manner that if sulfo-groups are present in $\beta$-position, they can be wholly or in part eliminated during the condensation. It is also possible to oxidize the product simultaneously with the condensation so that the anthraquinone derivatives are produced. In many cases the complete oxidation of the condensation products to anthraquinone derivatives also occurs when they are converted into a form suitable for dyeing acetate silk, for example by dissolution in sulfuric acid and pouring into water, and making into a paste with sulfite cellulose waste liquor.

The following examples illustrate the invention, the parts being by weight:—

Example 1

5.2 parts of sodium 1:5-dihydroxy-4:8-diamino-anthraquinone-2:6-disulfonate, together with 4.6 parts of sodium hydrosulfite and 2 parts of crystallized boric acid are heated in 25 parts by volume of aqueous ammonia solution of 33 per cent strength for 5 hours in a closed vessel at 100° C. The whole is filtered, the solid matter washed and dried. The condensation product formed dissolves in sulfuric acid to a yellow solution and in ethyl acetate to a blue solution. After reprecipitation from sulfuric acid and suspension by means of sulfite cellulose liquor the product dyes acetate silk powerful blue tints. This condensation product corresponds very probably with the 1-hydroxy-4:5:8-triaminoanthraquinone. The reaction has very probably occurred according to the following equation:—

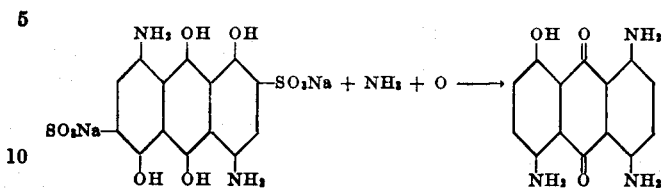

If this reaction has been carried out without boric acid, the condensation product obtained dyes acetate silk in appreciably redder tints. The difference is particularly pronounced in artificial light, in that the product condensed with boric acid retains its blue tint, whereas the product condensed without boric acid becomes redder and dull.

In precisely the same manner the example can be carried out with the isomeric 1:8-dihydroxy-4:5-diaminoanthraquinone-2:7-disulfonic acid as parent material.

*Example 2*

5.2 parts of sodium 1:8-dihydroxy-4:5-diaminoanthraquinone-2:7-disulfonate are mixed with 50 parts of water, 1.8 part of methylamine, 4.6 parts of sodium hydrosulfite and 2 parts of crystallized boric acid and the whole is heated for 20–30 minutes in the boiling water-bath. The solid product thus obtained is filtered, washed with hot water and dried. There are obtained about 2.8 parts of a dyestuff which is probably 1:8-diamino-4-hydroxy-5-methylamino-anthraquinone; this dissolves in organic solvents to a greenish blue solution. It dyes acetate silk, after reprecipitation from sulfuric acid, from a suitable suspension intensely greenish blue.

The reaction has very probably occurred according to the following equation:

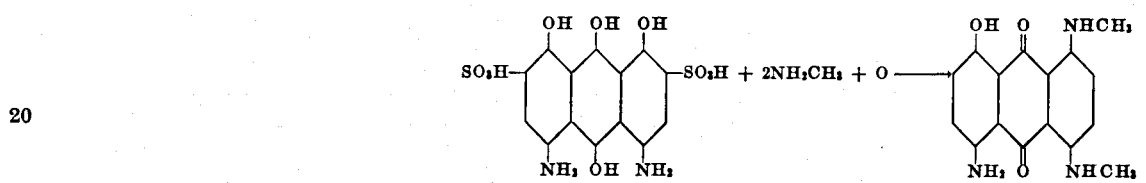

If the operation is conducted in a concentrated methylamine solution a product is obtained which is dyeing a much greener blue. This is very probably due to the fact that in that case the reaction has occurred as follows:

Instead of methylamine, a homologue or substitution product thereof may be used, for instance β-hydroxyethylamine, ethylenediamine or benzylamine. Instead of the 1:8-dihydroxy-4:5-diaminoanthraquinone-2:7-disulfonic acid there may be used 1:5-dihydroxy-4:8-diaminoanthraquinone-2:6-disulfonic acid. Mixtures and derivatives of both these bodies may also be used, the operation being otherwise the same.

Instead of disulfonic acids, monosulfonic acids may be used. The heating in a closed vessel may be conducted under pressure.

If the foregoing reaction is carried out without the addition of boric acid products are obtained which dye considerably more reddish tints.

*Example 3*

2.7 parts of 1:4:5:8-leucotetrahydroxyanthraquinone in the form of a fine paste, 35 parts of water, 2.7 parts of β-hydroxyethylamine and 2 parts of boric acid are heated together with access of air in the boiling water bath for ½–1 hour. The whole is filtered and the solid matter washed with hot water and made into a suspension with waste sulfite solution or similarly acting material. It dyes acetate silk powerful blue green tints. The condensation may also be conducted with exclusion of air, in which case the leuco

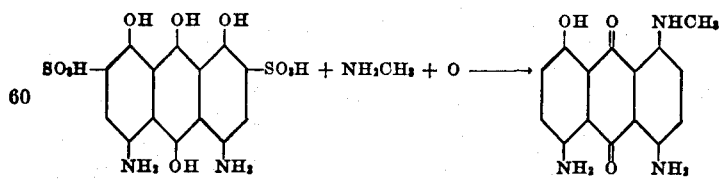

derivative of the dyestuff is produced, which can subsequently be oxidized in the air or otherwise in suitable manner. This product can also be made into a suspension and used to dye acetate silk powerful blue-green tints. The reaction has very probably occurred according to the following equation:

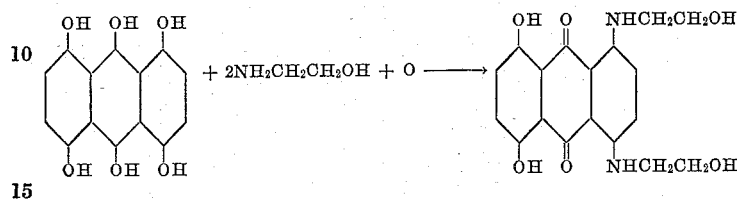

Without the addition of boric acid there is produced under otherwise exactly similar conditions, a product which dyes acetate silk more muddy and considerably more reddish blue tints.

*Example 4*

2.7 parts of leuco-1:5-dihydroxy-4:8-diaminoanthraquinone in fine suspension in 15 parts of an aqueous solution of methylamine of 25 per cent strength, are heated in a closed vessel in presence of 2 parts of boric acid for about 5 hours at 90–100° C. The reaction mixture is filtered and the solid matter is washed with hot water and dried; there are thus obtained about 2.3 parts of a product which dissolves in organic solvents to green-blue solutions and when brought in a suitable manner into the form of an aqueous suspension dyes acetate silk green-blue shades. If the reaction be conducted as described above, but without the addition of boric acid, there is obtained a product which is soluble in organic solvents to reddish blue solutions and dyes acetate silk reddish blue. The reaction has very probably occurred according to the following equation:

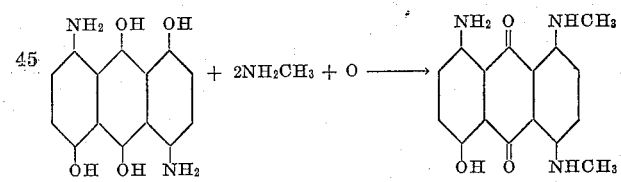

What I claim is:—

1. Process for the production of condensation products of the anthracene series, consisting in heating the leuco-derivatives of hydroxyanthraquinones corresponding with the general formula

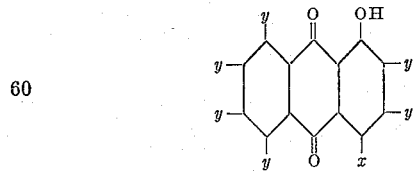

wherein $x$ stands for OH or NHR (R=H or alkyl), and $y$ stands for H or a substituent of a group of substituents, consisting of $SO_3H$, halogen, OH, O-alkyl, NH-R (R=H or alkyl) with amines of the general formula $NH_2\text{-}R_1$ ($R_1$=hydrogen, alkyl or aralkyl) in presence of water and boric acid.

2. Process for the production of condensation products of the anthracene series, consisting in heating the leuco-derivative of 1:4:5:8 - tetrahydroxyanthraquinone with an aqueous solution of β-hydroxyethylamine in presence of boric acid.

3. Process for the production of condensation products of the anthracene series, consisting in heating the leuco-derivatives of hydroxyanthraquinones corresponding with the general formula

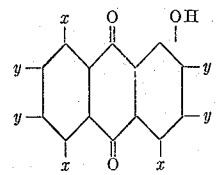

wherein $x$ stands for OH or NHR (R=H or alkyl) and wherein in every pair of the ortho-standing $y$'s one $y$ stands for an $SO_3H$-group and the other for an hydrogen atom, with amines of the general formula $NH_2\text{-}R_1$ ($R_1$= hydrogen, alkyl or aralkyl) in presence of water and boric acid.

4. Process for the production of condensation products of the anthracene series, consisting in heating the leuco-derivatives of hydroxyanthraquinones corresponding with the general formula

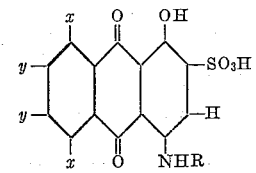

wherein one of the $x$'s stands for OH and the other for NHR (R=H or alkyl), and $y$ in the case where it is in ortho-position to the NHR-group stands for H and in the case where it is in ortho-position to the OH-group stands for $SO_3H$, with amines of the general formula NH₂R₁, wherein R₁ stands for H or alkyl, in presence of water and boric acid.

5. Process for the production of condensation products of the anthracene series, consisting in heating the leuco-derivative of a hydroxyanthraquinone corresponding with the formula

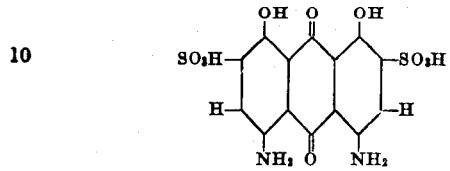

with primary aliphatic amines in presence of water and boric acid.

6. Process for the production of condensation products of the anthracene series, consisting in heating the leuco-derivative of a hydroxyanthraquinone corresponding with the formula

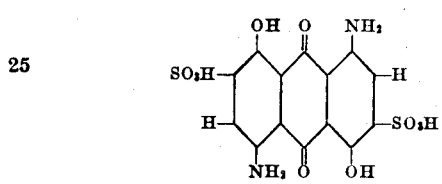

with ammonia in presence of water and boric acid.

7. Process for the production of condensation products of the anthracene series, consisting in heating the leuco-derivative of a hydroxyanthraquinone corresponding with the formula

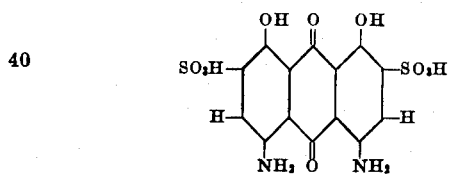

with methylamine in presence of water and boric acid.

8. As new products the anthraquinone derivatives corresponding with the general formula.

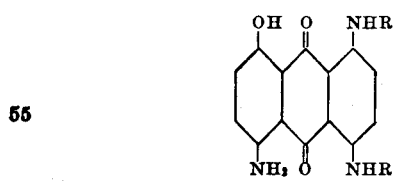

wherein one of the R's stands for a hydrogen atom and the other for alkyl or aralkyl, which products form dark powders which dissolve in sulfuric acid to yellow solutions and in ethyl acetate to blue to blue-green solutions, dyeing acetate silk similar tints.

9. As new products the anthraquinone derivatives corresponding with the general formula

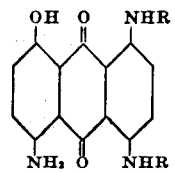

wherein one of the R's stands for a hydrogen atom and the other for methyl, which products form dark powders which dissolve in sulfuric acid to yellow solutions and in ethyl acetate to greenish-blue solutions, dyeing acetate silk similar tints.

10. As a new product the 1-methylamino-4:5 - diamino - 8 - hydroxyanthraquinone, which product forms a dark powder which dissolves in sulfuric acid to a yellow solution and in ethyl acetate to a greenish-blue solution, dyeing acetate silk similar tints.

In witness whereof I have hereunto signed my name this 20th day of January, 1931.

PAUL GROSSMANN.